US011797367B2

(12) United States Patent
Tan et al.

(10) Patent No.: US 11,797,367 B2
(45) Date of Patent: Oct. 24, 2023

(54) DISPLAYING PRE-BOOT ERROR MESSAGES (71) Applicant: Dell Products L. P., Round Rock, TX (US)

(72) Inventors: Geroncio Ong Tan, Austin, TX (US); Yi Fan Wang, Taipei (TW); Hong-Ji Huang, Hsin-Chu (TW); Craig Lawrence Chaiken, Pflugerville, TX (US); Timothy Carlyle Shaw, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 810 days.

(21) Appl. No.: 16/530,171

(22) Filed: Aug. 2, 2019

(65) Prior Publication Data
US 2021/0034452 A1 Feb. 4, 2021

(51) Int. Cl.
*G06F 11/00* (2006.01)
*G06F 11/07* (2006.01)
(Continued)

(52) U.S. Cl.
CPC ........ *G06F 11/0769* (2013.01); *G06F 9/4403* (2013.01); *G06F 11/0745* (2013.01);
(Continued)

(58) Field of Classification Search
CPC .... G06F 11/00; G06F 11/073; G06F 11/0733; G06F 11/0745; G06F 11/0751;
(Continued)

(56) References Cited

U.S. PATENT DOCUMENTS 6,373,498 B1 * 4/2002 Abgrall ................. G06F 9/4406
345/619
6,791,572 B1 * 9/2004 Cloney ................. G06F 9/4401
713/1
(Continued)

FOREIGN PATENT DOCUMENTS

JP 2004213165 A * 7/2004

OTHER PUBLICATIONS

Statement regarding sale of Two-in-one and detachable computer systems, 1 page, Feb. 6, 2023.

*Primary Examiner* — Anthony J Amoroso
(74) *Attorney, Agent, or Firm* — Egan, Enders & Huston LLP.

(57) ABSTRACT

In some examples, a computing device may include a plurality of components, an embedded controller, and a read-only memory (ROM) to store a basic input output system (BIOS). A display device connected to the computing device may include a display panel and a timing controller. The embedded controller may be configured with instructions to determine that a power-on has been initiated, determine that a particular component of the plurality of components of the computing device has an issue that prevents booting the BIOS, and send a message from the embedded controller to the timing controller. The message may instruct the timing controller to display, on the display panel and before the CPU begins execution, one or more error messages associated with the particular component that has the issue preventing booting the BIOS. In some cases, a logo may be displayed along with the one or more error messages.

20 Claims, 5 Drawing Sheets

(51) Int. Cl.
*G06F 13/28* (2006.01)
*G06F 9/4401* (2018.01)
*G06F 13/42* (2006.01)
*G06F 11/32* (2006.01)

(52) U.S. Cl.
CPC ........ *G06F 11/0751* (2013.01); *G06F 11/327* (2013.01); *G06F 13/28* (2013.01); *G06F 13/4282* (2013.01); *G06F 2213/0016* (2013.01)

(58) Field of Classification Search
CPC ............. G06F 11/0757; G06F 11/0766; G06F 11/0769; G06F 11/0772; G06F 11/0775; G06F 11/0778; G06F 11/0787; G06F 11/079; G06F 11/0793; G06F 11/1417; G06F 11/2284; G06F 11/30; G06F 11/3041; G06F 11/3058; G06F 11/3062; G06F 11/3086; G06F 11/3093; G06F 11/321; G06F 11/324; G06F 11/327; G06F 11/328; G06F 9/4401; G06F 9/4403; G06F 9/4406; G06F 9/4411; G06F 9/4416; G06F 9/4418; G06F 13/28; G06F 13/4282; G06F 2213/0016; G06F 3/0227; G06F 3/023; G06F 3/038; G06F 3/0412; G06F 3/0481; G06F 3/04886; G06F 3/1423; G06F 3/1446; G06F 3/1454; G06F 3/147; G06F 3/16; G06F 1/1616; G06F 1/1641; G06F 1/1652; G06F 1/1677; G06F 1/1681; G06F 1/1694; G06F 1/206; G06F 1/26; G06F 1/266; G06F 1/3203; G06F 1/3206; G06F 1/3265; G06F 21/53; G06F 21/572; G06F 21/575; G06F 8/63; G06F 16/10; G06F 16/7328; G06F 17/40; G06F 221/2105; G06F 2201/805; G06F 2201/83; G06F 2200/1614; G06F 2203/04803
See application file for complete search history.

(56) References Cited

U.S. PATENT DOCUMENTS

| | | | |
|---|---|---|---|
| 6,845,277 B1* | 1/2005 | Michelet | G06F 11/324 714/48 |
| 8,922,585 B2* | 12/2014 | Autor | G09G 5/363 345/629 |
| 2016/0117176 A1* | 4/2016 | Gillon | G06F 9/4403 713/2 |
| 2017/0116840 A1* | 4/2017 | Montero | G08B 21/18 |

* cited by examiner

DISPLAYING PRE-BOOT ERROR MESSAGES

BACKGROUND OF THE INVENTION

Field of the Invention

This invention relates generally to displaying pre-boot error messages on a computing device and, more particularly to displaying error messages (e.g., using text, graphical images, or both) when the computing device is incapable of booting up, such as when there is an issue with the central processing unit (CPU) or other component that is preventing booting up the computing device.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When power to an information handling system (IHS), such as a server, a desktop, a laptop, a tablet, a smartphone, or the like is turned on, the IHS may execute a POST (Power-On Self-Test). The POST is a diagnostic testing sequence that a computer's basic input/output system (BIOS) executes to determine if components, such as, for example, the computer keyboard, random access memory, disk drives, and other hardware components are working correctly. If all the hardware components are detected and found to be operating properly, the BIOS initiates a boot process (e.g., to load an operating system). If at least one of the hardware components is not detected or found to be inoperable, the BIOS may communicate an error using a series of coded sounds (e.g., beeps) or by blinking various colored light emitting diodes (LEDs) on the motherboard. Because POST runs before the computer's video card is activated and before the video driver is loaded, the IHS may be unable to display text-based error messages. Asking a user to count and report the number of beeps or LED blinks to a technician may be frustrating for the user, particular if the user is not technologically savvy. In addition, the technician may struggle to diagnose the problem(s) because the technician may be relying on the user to count and communicate the number of beeps and/or LED blinks. Any error on the part of the user in counting and/or communicating may cause the technician to misdiagnose the problem. Thus, when a computing device (e.g., an IHS) cannot boot, the process of providing diagnostic information about the reasons why the computing device cannot boot (e.g., due to hardware problems) may be crude, thereby costing both the user and the technician a significant amount of time and effort and causing both frustration with the process of diagnosing and resolving the problems. It may also be expensive to unnecessarily send and replace the motherboard with a new motherboard if the problem is not hardware-related and could be diagnosed with more precise error information.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may include a plurality of components, an embedded controller, and a read-only memory (ROM) to store a basic input output system (BIOS). A display device connected to the computing device may include a display panel and a timing controller. The embedded controller may be configured with instructions to determine that a power-on has been initiated, determine that a particular component of the plurality of components of the computing device has an issue that prevents booting the system, and send a message from the embedded controller to the timing controller. The message may instruct the timing controller to display, on the display panel, one or more error messages associated with the particular component that has the issue preventing booting the system. The error messages may be provided using a particular language (e.g., English, French, German, Mandarin, Hindi, Japanese, or the like) or using icons illustrating the component, the issue, or both. The error messages may be displayed before a central processing unit (CPU) begins to execute and before a video driver has been loaded. In some cases, an image (e.g., manufacturer's logo or other logo) may be displayed along with the one or more error messages.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable one or more warning or error messages to be displayed when one or more issues or events prevent a computing device booting normally. For example, most computing devices perform a power-on self-test (POST) after the computing device is powered on. The POST is part of a computing device's pre-boot sequence. If the POST is successfully completed, a bootstrap loader (e.g., basic input output system (BIOS)) is invoked to load an operating system. The issues that are discovered during POST and prevent booting may include, for example, a missing or dead (e.g., fully discharged) battery (e.g., on a laptop) with the power adapter attached to the laptop, a central processing unit (CPU) issue (e.g., overheating, not receiving enough power, fan not working or providing insufficient cooling, and the like), random access memory (RAM), issue (e.g., error when accessing RAM), read only memory (ROM) issue (e.g., error when accessing ROM), power supply issue (e.g., insufficient power being provided, unauthorized or incompatible power supply attached, or the like), boot issue (e.g., bootable media not found), video issue (e.g., error when accessing video RAM, graphic processing unit (GPU) overheating, or the like), another type of issue that prevents the computing device from booting, or any combination thereof. In another example, some special events may cause the system to take longer time to boot than usual. Displaying a warning message (e.g., indicating a longer than normal boot) reassures the user that the system is booting and not hanging. Displaying information before the CPU is turned ON and before the graphics driver is ready may be referred to as "sign of life". Displaying additional error messages during this period may be referred to as "enhanced sign of life" because during POST the EC determines whether the computing device has sufficient health (e.g., components are powered on and accessible, power is available, and the like) to boot.

The error messages may be displayed directly by a timing controller (TCON) associated with a display device, e.g., before the BIOS has started executing, before an operating system (OS) has been loaded, and before a video driver has been loaded. The error messages may be text-based or one or more graphical images (e.g., rather than a series of blinking lights or a series of beeps) messages that provide detailed information about the issue(s). For example, a first error message may identify a particular component. In some cases, one or more additional error messages may provide additional information. For example, a second error message may provide additional information, such as a particular condition, associated with the particular component. A third error message may ask the user to perform one or more actions associated with the particular component. To illustrate, the first error message may be a message warning the user that due to special system conditions, boot time may be longer than normal, the second error message may indicate one or more POST errors, and a third error message may indicate a power-related error, such as for example, an error indicating that the AC adapter currently attached is undersized and unable to power ON the system, e.g., "Battery: discharged. Please wait while the battery is being charged to a minimum state of charge." As another illustration, if the battery is critically low (e.g., below a predetermined threshold) and a power adapter (e.g., to provide direct current (DC) power) is not attached to the computing device, the third error message may ask the user to attach a power adapter to enable the battery to be charged without having to power on the CPU, e.g., "Battery: discharged. Please attach a power adapter to charge the battery." Of course, depending on the implementation, one or more error messages may be displayed. By displaying one or more error messages identifying the issue(s) preventing boot-up, the user may be able to perform one or more actions to address the issues and/or a technical support specialist may perform or ask the user to perform one or more actions to address the issues. In some cases, one of the error messages may include an error code. For example, the first error message may indicate the component, e.g., "System Error, CPU:" and the second error message may indicate an error code, e.g., "123". In this example, when displayed, the error messages may appear as "System Error, CPU: 123". In this way, users and technical support specialists do not have to troubleshoot issues preventing booting using cryptic and hard-to-decipher error codes (e.g., displayed using blinking lights or beeps emitted by a speaker of a motherboard).

Thus, one or more issues prevent the system from booting into the OS identified by an EC during pre-boot may be displayed to the user and/or service technician, thereby enabling a more precise diagnosis of the problem. For example, if a laptop battery is dead or depleted, a nonstandard power adapter may satisfy a minimum power requirement of the computing device but may not support peak power capabilities. In such cases, the POST may determine whether the battery has a minimum state of charge to supplement the power adapter. If the battery lacks the minimum state of charge, appropriate error message(s) may be displayed. In such cases, the EC may instruct the TCON to display on-screen message(s) to warn the user that the adapter is underpowered and thus unable to start the system, and that the battery needs to be charged to a particular level (e.g., 5%, 10%, 15%, 20% or the like) before the boot process can be initiated.

An image (e.g., a bitmap (BMP) or other digital image format) of a splash screen (e.g., a device manufacturer's logo, such as for Dell®) may be assembled using data stored in a flash memory that is accessible to the TCON. The error messages may be stored in the flash memory that is accessible to the TCON. After power-on has been initiated, if no errors are encountered during pre-boot (e.g., POST), then the TCON may be instructed by the EC to load an image (e.g., BMP) that includes the logo to a frame buffer associated with the display device, e.g., using direct memory access (DMA) or a similar technology. DMA may enable fast transfer of the splash screen data from the flash memory to the frame buffer to be displayed. After power-on has been initiated, if one or more errors (e.g., issues) are identified during pre-boot (e.g., POST), then the TCON may be instructed by the EC to load (e.g., using DMA) the logo along with one or more error messages corresponding to the one or more errors from the flash memory to the frame buffer associated with the display device. For example, the logo and the error messages may be copied from a table (or other data structure), assembled into a composite bitmap, and transferred via DMA into the flash memory. The message(s) may be selected from the table based on the particular issues (e.g., errors) identified during the pre-boot scan (e.g., POST). Thus, while the number of pixels used to display the splash screen are fixed, when no errors are encountered, a larger area is available for the logo to be displayed. For example, the splash screen area may be 40% of the display area and the logo takes up a small portion of the splash screen. The systems and techniques described herein may use the remaining portion of the splash screen to display detailed error information. When one or more errors are encountered, the logo area may be reduced to make room for one or more error messages, or these messages may be superimposed with the logo to create a new splash screen, thereby providing meaningful troubleshooting information to the user and to technical support specialists After the EC determines that the POST did not find any issues and that the boot process can proceed, the EC may display just the logo (e.g., as the splash screen) and initiate a bootup of the BIOS. After the BIOS has successfully completed booting, the BIOS may send a signal to the EC indicating that the output of a video source (e.g., embedded DisplayPort (eDP) or other video source) of the computing device is ready. The video source (e.g., eDP) may be internal to the computing device. In response to receiving the signal from the BIOS, the EC may use a control signal to instruct the TCON to switch from displaying the splash screen (e.g., stored in the flash memory) to displaying output from the internal video source (e.g. eDP) of the computing device. Typically, the time from power-on to the time the logo is displayed is on the order of milliseconds (ms) (e.g., 500 ms), rather than seconds when the logo is displayed by the CPU.

An operating system manufacturer (e.g., Microsoft®) may specify that a custom logo or image is to be displayed centered in a pre-defined region of the splash screen. This region may be referred to as the "reserved logo box". The reserved logo box is an area of the display device which the operating system manufacturer (e.g., Microsoft®) has indicated that the computing device BIOS has control over. The size of the BMP may be based on (e.g., proportional to) the screen resolution. For example, for a full high definition (FHD=1920×1080 pixels) display panel, the reserved box, may be a particular percentage (e.g., 40%, 50%, 60% or the like) of the total area. To illustrate, 40% of an FHD display panel may be 768×432 pixels. Because the reserved logo box has been reserved for and is under the control of the BIOS, and typically the logo does not take up this entire area, the EC can display the logo and use the remaining area to display one or more error messages. For example, in the case of the FHD panel, the bottom 23 pixels may be used to display a single line (e.g., that may include one or more error messages). Of course, in some cases, an even smaller logo may be displayed, or the logo may not be displayed to enable the EC to display additional error messages and diagnostic information.

One or more of the components (e.g., EC, TCON, BIOS, and the like) may use a particular protocol, such as 1-wire, I2C, or similar protocol, to communicate with each other For example, the EC may instruct the TCON using the I2C protocol whether to display (i) just the logo or (ii) a logo with one or more predefined error messages.

In some cases, a particular manufacturer may use different modes. When the EC does not find any issues during pre-boot, the EC may enter a first mode in which a logo of the manufacturer of the computing device may be displayed. When the EC determines a first type of issue during pre-boot, the EC may enter a second mode in which the logo of the manufacturer of the computing device may be displayed and an error message may be displayed, e.g., "Booting will take longer than normal". When the EC determines a second type of issue during pre-boot, the EC may enter a third mode in which the logo of the manufacturer of the computing device may be displayed, an error message may be displayed, and an error code may be displayed, e.g., "System Error, CPU: 123". For example, the first type of issue may be a simple issue whereas the second type of issue may be a more complex issue in which a particular issue or component is identified and a second error message provides additional information, such as a particular error code associated with the particular issue or particular component.

Thus, when a power-on is performed on a computing device, an EC may power up to initiate a pre-boot diagnostic checkup (e.g., POST). If the EC determines that there is an issue (e.g., an error) that prevents booting, then the EC may instruct a TCON to copy (e.g., via DMA), from a flash memory to a frame buffer, a logo and one or more error messages associated with the issue to create a composite bitmap image. The error messages may identify an issue or a component and, in some cases, provide further details, such as an error code or other information. If the EC determines that there are no issues preventing booting, then the EC may instruct the TCON to copy (e.g., via DMA) the logo to the frame buffer. Placing the splash screen image (e.g., BMP) into the frame buffer of a display device may cause the splash screen image (e.g., either (i) the logo or (ii) the logo and one or more error messages) to be displayed by the display device (e.g., connected to the computing device). If the EC did not detect any issues during pre-boot, then the EC may initiate boot-up of a BIOS of the computing device. During the BIOS boot-up, after the video source (e.g., eDP) of the computing device has been initialized, the BIOS may signal (e.g., instruct) to the EC that the video source is ready. In response, the EC may signal (e.g., instruct) the TCON to switch from displaying the contents of the frame buffer to displaying the output of the video source (e.g., part of the peripheral hub controller (PCH)). The BIOS may continue booting, including loading an operating system (OS). Thus, when a pre-boot issue is encountered, the logo and one or more user readable error messages/codes describing the issue (e.g., in English or another language) may be displayed. In this way, a user or a service technician can quickly identify and resolve the issue, as compared to a conventional system that causes one or more lights on a motherboard to blink or causes a speaker to emit a series of beeps.

As an example, a computing device may include a plurality of components, an embedded controller and a read-only memory (ROM) to store a basic input output system (BIOS). For example, the plurality of components may include a central processing unit (CPU) or system, a random-access memory (RAM), a battery connected to the computing device, a power adapter connected to the computing device, the BIOS, and at least one storage device connected to the computing device. A display device that includes a timing controller (TCON) and a display panel may be connected to the computing device. The embedded controller may be configured to determine that a power-on of the computing device has been initiated. For example, a user may have pressed a power selector button or performed another action to initiate the power-on. In response, the embedded controller may determine a status of individual components of the plurality of components. To determine a status of a battery of the computing device, the embedded controller may access data (e.g., a battery status register) managed by a battery management unit of the computing device. If the embedded controller determines that a particular component of the plurality of components of the computing device has an issue that prevents booting the BIOS, then the embedded controller may send a message to the TCON.

The message may instruct the timing controller to display, on the display panel, one or more error messages associated with the particular component having the issue that is preventing booting the BIOS. For example, the one or more error messages may use text to indicate at least one of: a power adapter is not connected to the computing device, the power adapter is incompatible with the computing device, the power adapter is inadequate for a power usage of the computing device, the battery is not present, a request to connect the battery, a charge level of the battery is below a predetermined level, the battery is being charged, a boot process will initiate after the charge level is equal to or above the predetermined level, a boot process will take longer than normal, a bootable image was not found on one or more storage devices connected to the computing device, a processor error associated with a central processing unit (CPU) occurred, a memory error associated with a random-access memory (RAM) of the computing device occurred, a ROM error associated with the ROM occurred, or an error code (e.g., associated with a particular component of the plurality of components).

In some cases, the message may instruct the timing controller to display a logo, along with the one or more error messages, on the display panel. The message may be communicated via an I2C protocol. The TCON may copy the one or more error messages from a flash memory (e.g., SLI flash) that is accessible to the TCON to create a bitmap (BMP) image (e.g., splash screen) and transfer the bitmapped image via direct memory access (DMA) to a frame buffer associated with the display panel, causing the display panel to display the bitmap image. After the embedded controller determines that the issue that prevented booting the BIOS of the computing device is not present (e.g., the issue has been resolved and there are zero issues preventing booting), then the embedded controller may initiate booting the BIOS. The embedded controller may send a second message to the TCON instructing the TCON to display, on the display panel, a logo (e.g., during the boot process). The embedded controller may receive an instruction (e.g., a signal) from a video source (e.g., eDP of a PCH) of the computing device that the video source is available. In response, the embedded controller may send a third message to the TCON instructing the TCON to display, on the display panel, an output of the video source (e.g., eDP of the PCH).

Figure 1:
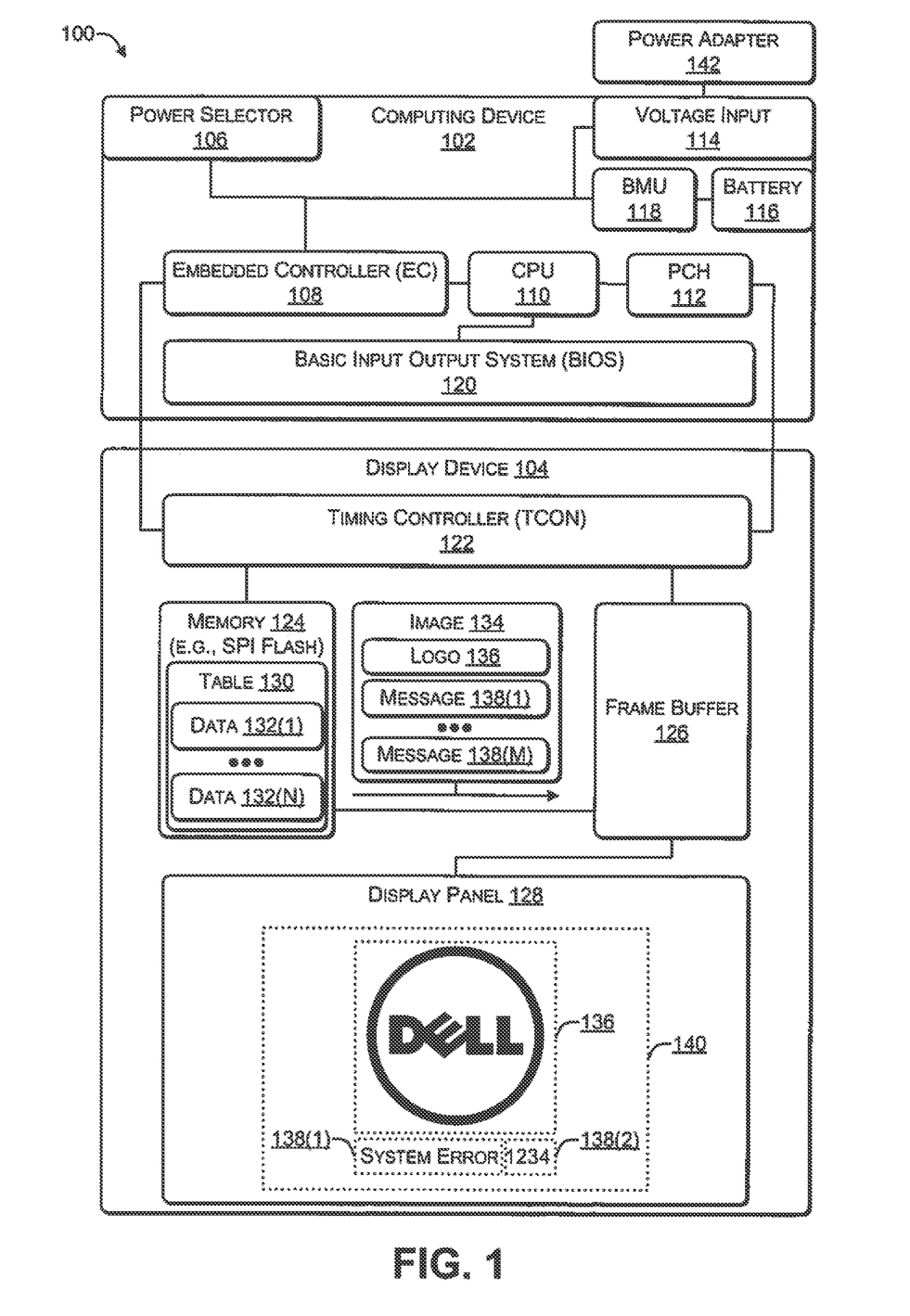
FIG. 1 is a block diagram of a system that includes a computing device connected to a display device, according to some embodiments.

FIG. 1 is a block diagram of a system 100 that includes a computing device connected to a display device, according to some embodiments. In the system 100, a computing device 102 may be connected to a display device 104. For example, the system 100 may be a smartwatch, a smartphone, a tablet, a laptop, a 2-in-1 (e.g., a laptop that can be separated into two pieces that include a tablet), a desktop, or another type of computing device.

The computing device 102 may include a power selector 106 (e.g., power button) to enable a user to turn power to the computing device 102 on or off. The computing device 102 may include an embedded controller (EC) 108, a central processing unit (CPU) 110, a peripheral controller hub (PCH) 112, and a basic input output system (BIOS) 120. The EC 108 may be a microcontroller that performs various functions that the CPU 110 does not perform, such as detecting when the power selector 106 has been selected (power-on) or de-selected (power-off), performing a pre-boot check of components (e.g., power-on self-test (POST) or the like), and initiating booting the BIOS 120. The CPU 110 may include one or more processors each having one or more cores. The PCH 112 controls particular data paths and support functions used in conjunction with the CPU 110, such as, for example, a system clock, and the like. Depending on the architecture being used, a video source (e.g. eDP) may be provided by the CPU 110 or the PCH 112. The computing device 102 may include a voltage input 114 (e.g., to receive power from a power adapter 142), a battery 116, and a battery management unit (BMU) 118. The BMU 118 may set a register when the battery 116 is removed (e.g., from a laptop). The BIOS 120 may be non-volatile firmware used to perform hardware initialization during the booting process (power-on startup), and to provide runtime services for an operating system and applications. The BIOS 120 may initialize hardware components (e.g., the CPU 110, the PCH 112, and the like), and use a boot loader to initialize an operating system. The BIOS 120 may use flash memory to enable the BIOS 120 to be updated. In some cases, the BIOS 120 may include a Unified Extensible Firmware Interface (UEFI) or similar interface.

The display device 104 may include a timing controller (TCON) 122, a memory 124, a frame buffer 126, and a display panel 128. The TCON 122 may be an application specific integrated circuit (ASIC) that implements a timing controller for the display panel 128. The memory 124 may be a serial peripheral interface (SPI) flash memory, e.g., a non-volatile storage that is erasable and rewriteable via a SPI (or similar interface). The memory 124 may include a data structure, such as a table 130 or similar, that is used to store multiple data items 132(1) to 132(N) (N>0). The data items 132 may include a logo of a manufacturer of the computing device 102 error messages, error codes, quick reference or quick response (QR) codes, error icons, and the like. For example, an icon (e.g., image) of a battery may be displayed when a battery issue is detected, an icon of a CPU may be displayed when a CPU issue is detected, an icon of memory chip may be displayed when a memory issue is detected, and the like.

The TCON 122 may select particular ones of the data items 132 to assemble an image 134 (e.g., BMP), in the frame buffer 126, of a custom splash screen for display on the display panel 128. For example, the TCON 122 may select a logo stored in the data items 132 and place a logo 136 in the frame buffer 126. If an issue (e.g., error) was identified during pre-boot, the TCON 122 may select one or more messages from the data items 132 and place messages 138(1) to 138(M) (M>=0, M<N) in the frame buffer 126. The messages 138 may be selected based on the issue that was encountered. For example, if a CPU issue is encountered, the messages 138 may indicate that the issue is associated with the CPU 110 and, in some cases, provide additional information (e.g., an error code). If a memory issue is encountered, the messages 138 may indicate that the issue is associated with a memory (e.g., RAM) of the computing device 102 and, in some cases, provide additional information (e.g., an error code). If a battery issue is encountered, the messages 138 may indicate that the issue is associated with the battery 116 or power adapter 142 and, in some cases, provide additional information (e.g., provide an instruction to the user to use a compliant power adapter 142, provide an instruction to the user to wait while the battery charges to a predetermined level, or the like). In this way, the TCON 122 may assemble the image 134 (e.g., a bitmap of a splash screen). After the TCON 122 creates the image 134 (e.g., the logo 136 along with zero or more messages 138), the TCON 122 may cause the image 134 to be transferred (e.g., via direct memory access (DMA)) to the frame buffer 126 for display by the display panel 128. For example, as illustrated in FIG. 1, the display panel 128 may display the logo 136, a first error message 138(1), and a second error message 138(2) in a logo box 140. The logo box 140 may be a portion of the display panel 128 reserved for the BIOS 120 to display pre-boot and boot messages, including the logo 136 and zero or more messages 138. For example, if the display panel 128 is a full high definition (FHD) panel (e.g., 1920×1080 pixels), then 40% of the FHD display panel 128 (e.g., 768×432 pixels) may be reserved for the logo box 140. In this way, the systems and techniques described herein are able to display detailed error messages on the display panel 128 before the CPU 110 is executing. For example, the detailed error messages may, in some cases, include information about issues with the CPU 110.

When a user selects the power selector 106 to power-on the computing device 102, the EC 108 may power up and initiate a pre-boot diagnostic checkup (e.g., POST) to check various components (e.g., the CPU 110, the battery 116, the BIOS 120, RAM, and the like). If the EC 108 determines that there is an issue that prevents booting, then the EC 108 may instruct the TCON 122 to copy, from the table 130 to the frame buffer 126, a small logo (e.g., the logo 136) and one or more error messages (e.g., the messages 138) associated with the issue to create the image 134 (e.g., a bitmap). The error messages 138 may identify an issue or a component and, in some cases, provide further details, such as an error code or other information associated with the issue. The logo 136 may be displayed within one second (e.g., approximately 500 milliseconds) of the power selector 106 being selected. In a conventional boot process, if the user does not see the computing device 102 to respond within a few seconds of selecting the power selector 106, the user may re-select the power selector 106, inadvertently initiating a power-off, though the user intending to power-on the computing device 102. By quickly (e.g., in one second or less) displaying the logo 136, such situations may be avoided. In some cases, multiple sized logos (e.g., large, medium, and small) may be used. For example, a large logo may be used when no issues are detected. A medium or small logo may be used to display additional details regarding an issue or an error that was identified.

If the EC 108 determines that there are no issues preventing booting, then the EC 108 may instruct the TCON 122 to copy (e.g., via DMA), from the flash memory 124 to the frame buffer 126, the logo 136 to create the image 134 (e.g., a bitmap). Placing the image 134 in the frame buffer 126 may cause the image 134 (e.g., either (i) the logo 136 or (ii) the logo 136 and one or more error messages) to be displayed by the display panel 128. If the EC 108 does not detect any issues that would prevent booting during pre-boot (e.g., POST), then the EC 108 may initiate boot-up of the BIOS 120 of the computing device 102. During the BIOS 120 boot-up, after the video source (e.g., eDP) that is part of the PCH 112 has been initialized, the BIOS 120 may signal (e.g., instruct) the EC 108 that the PCH 112 is ready to provide a video signal. In response, the EC 108 may signal (e.g., instruct) the TCON 122 to switch from displaying the contents of the frame buffer 126 to displaying the output of the video source of the PCH 112. The BIOS 120 may continue booting, including loading an operating system (OS). Up to this point, the CPU 110 has not started executing. In a conventional system (e.g., in which the CPU 110 displays error messages), no error messages can be displayed at this point because the CPU 110 has not begun to execute and the video driver has not yet been loaded.

Thus, after the EC performs a pre-boot test, if no issues are found that would prevent booting, the EC may cause a logo to be displayed on the display device, and boot the BIOS, which eventually loads the operating system. When the EC encounters a pre-boot issue, a small logo (e.g., smaller than the large logo) and one or more error messages describing the issue in text (e.g., in English or another language) may be displayed. For example, the EC may compose a splash screen by selecting the logo and the messages from a table stored in memory (e.g., SPI flash) and transfer the splash screen via DMA to the frame buffer, causing the contents of the frame buffer to be displayed by the display panel. In this way, a user or a service technician viewing the error message(s) can quickly identify and resolve the issue, as compared to a conventional system that causes one or more lights on a motherboard to blink or causes a speaker to emit a series of beeps.

Figure 2:
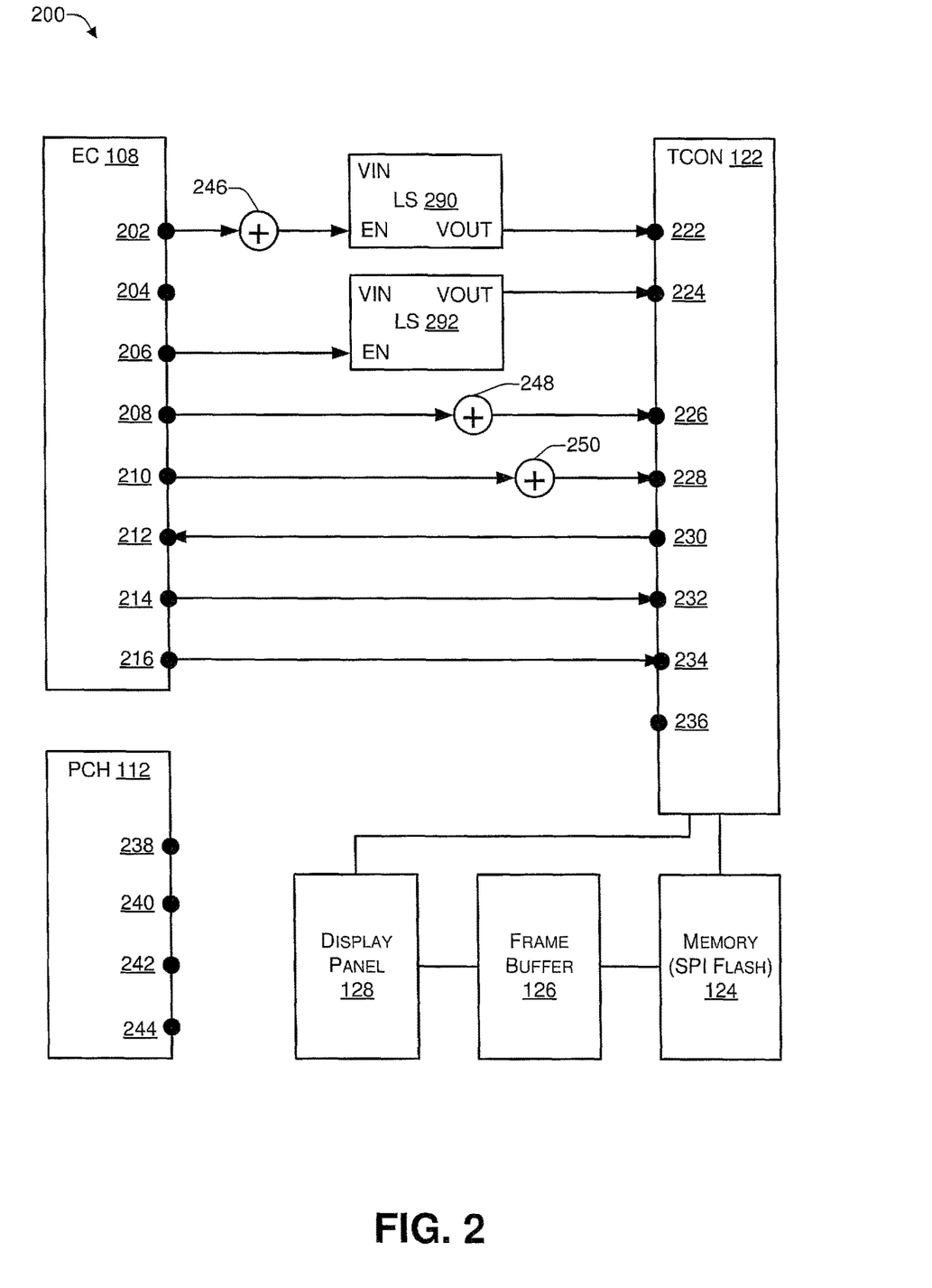
FIG. 2 is a block diagram illustrating pre-boot signals between components, according to some embodiments.

FIG. 2 is a block diagram 200 illustrating pre-boot signals between components, according to some embodiments. For illustration purposes, the interactions between the components assume that the display panel 128 is a liquid crystal display (LCD) panel. However, it should be understood that similar types of interactions as those described herein may occur with other types of display panels, such as, for example, light emitting diode (LED) panels, organic LED (OLED) panels, and the like.

In FIG. 2, the EC 108 includes signaling connections 202, 204, 206, 208, 210, 212, 214, and 216, 204 is a PCH_ENVDD (e.g., a voltage signal to enable power to the TCON from a PCH, it is also connected to the EC to inform the EC that the PCH is ready to turn on the display panel, usually after the graphics driver has successfully loaded), 202 is an LCD_ENVDD (e.g., a voltage signal to enable power to the TCON, this signal is used by the EC to turn ON the TCON before the PCH is ready or unable to), 206 is an EN_INVPWR (e.g., enables power to the display panel), 208 is a PANEL_BKEN_EC (e.g., a signal to enable backlight of display panel), 210 is a BIA_PWM_EC (e.g., a pulse width modulation (PWM) signal used to control the brightness of the backlight of the display panel), 212 is an SOLC (e.g., sign of life control signal), 214 is SOLC_CLK (e.g., sign of life clock signal), and 216 SOLC_DAT (e.g., sign of life data signal).

The TCON 122 includes signaling connections 222, 224, 226, 228, 230, 232, 234, and 236. 222 is LCDVDD (e.g., a voltage for the TCON), 224 is INV_PWR_SRC (e.g., main power to the LCD), 226 is DISPOFF (e.g., a signal to turn the display panel off), 228 is INV_PWM (e.g., PWM input to control the brightness of the backlight of the display panel), 230 is an SOLC (e.g., sign of life control signal), 232 is SOLC_CLK (e.g., sign of life clock signal), 234 is SOLC_DAT (e.g., sign of life data signal), and 236 is eDP_HPD (e.g., a signal from an embedded DisplayPort (eDP) asserting hot plug detect (HPD)).

The PCH 112 includes signaling connections 238, 240, 242, and 244. 238 is eDP_HPD (e.g., a signal from the TCON to the PCH asserting a presence of the display), 240 is PCH_ENVDD (e.g., a signal indicating that the graphics driver is loaded and ready to send a signal to the display panel), 242 is ENBLK (e.g., a signal indicating to start a backlight), and 244 is PCH_INV_PWM (e.g., a signal from the PCH to enable the main power to the display panel).

LS 290 and LS 292 are load switches. A load switch is a switch that connects or disconnects a load to a power source. 346, 348, and 350 are OR logic circuits.

During pre-boot, the EC 108 turns ON the TCON by enabling LCD_ENVDD 202, upon completing its FW load from the memory 124, TCON 122 notifies the EC 108 that it is ready to receive command by toggling the sign of life (SOL) signal SOLC 230 to SOLC 212. The EC 108 then sends command to the TCON via the SOLC_CLK 214 to the SOLC_CLK 232 of the TCON 122 (e.g., clock line), and provide SOLC_DAT 216 to SOLC_DAT 234 of the TCON 122 (e.g., data line). In this way, the EC 108 may cause the TCON 122 to display a logo, and if an issue was found, display (in addition to the logo) one or messages providing information about the issue. For example, as previously described, the EC 108 may instruct, using the signals 214, and 216, the TCON 122 to assemble a splash screen (e.g., a logo and, in some cases, one or more error messages) in the frame buffer 126 and then instruct the TCON 122 to transfer the contents of the frame buffer 126 to the display panel 128 using DMA. For example, the instructions send by the EC 108 over the signals 214, 216 and received by the TCON 122 as 232, 234, respectively, may use the I2C (or similar) protocol.

The EC 108 may provide signal LCD_ENVDD 202 (to enable the LS 210), which in turn provide power to the LCDVDD 222 to turn ON the TCON 122. The EC 108 may provide the EN_INVPWR 206 signal (e.g., to enable the LS 212) to the INV_PWR_SRC to power the display panel 128. The EC 108 may provide the PANEL_BKEN_EC 208 signal (e.g., via the OR logic 248) to the DISPOFF 226, to enable (e.g., turn on) a backlight of the display panel 128. The EC 108 may provide the BIA_PWM_EC 210 signal to the INV_PWM 228 (e.g., via the OR logic 250), to control the brightness of the LCD backlight by pulse width modulation (PWM). In this way, the EC 108 instructs the TCON 122 to power on various components associated with the display panel 128 before the PCH is turned ON.

During pre-boot, the EC 108 may ready the BMU 118 of FIG. 1 to determine if the battery 116 was removed before being placing back in the computing device 102 (e.g., indicating whether the EC is to clear the battery register), what the current battery level is (e.g., indicating whether the EC 108 is to display a message asking the user to wait for the battery 116 to be charged to a pre-determined level), whether a power adapter (e.g., power adapter 142 of FIG. 1) is connected to the voltage input 114 (e.g., indicating whether to display a message to connect the power adapter 142 if the battery level is below a particular level), whether the 142 satisfies the charging specifications of the battery 116 or whether the power adapter 142 is compliant with a standard promulgated by the manufacturer of the computing device 102 (e.g., indicating whether to display a message to connect a compliant power adapter), and the like.

Thus, during pre-boot (e.g., before the CPU is executing and before the video driver has been loaded), the EC may instruct the TCON to power-on various components (e.g., backlight, PWM controller, and the like) of the display panel. In addition, the EC may instruct the TCON to assemble a splash screen image (e.g., a logo and zero or more messages) in a frame buffer and display the assembled image (e.g., BMP) on the display panel.

Figure 3:
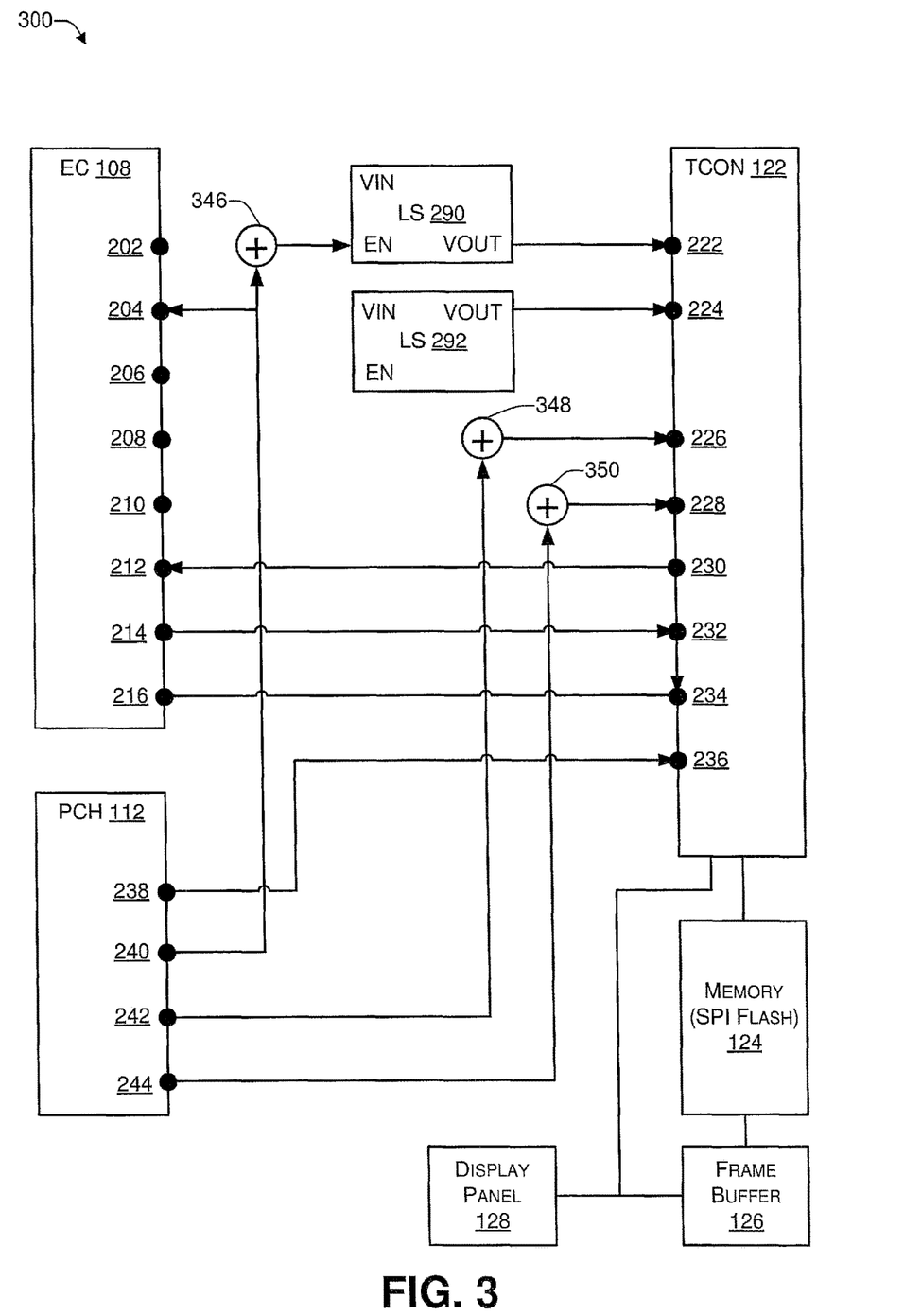
FIG. 3 is a block diagram illustrating post-boot signals between components, according to some embodiments.

FIG. 3 is a block diagram 300 illustrating post-boot signals between components, according to some embodiments. If no issues were found during pre-boot, then the EC 108 causes the BIOS 120 of FIG. 1 to boot. During the boot of the BIOS 120, after the PCH 112 is ready, the PCH 112 sends a signal from PCH_ENVDD 240 of the PCH 112 to PCH_ENVDD 204 of the EC 108, indicating that the PCH 112 is ready. PCH_ENVDD 240 is ORed with EC output LCD_ENDVDD 202. In response, the EC 108 release control of enabling the LS 290 to the PCH 112. From this point forward, TCON 122 is controlled by the PCH 112. EC 108 also instructs the TCON 122 to switch from displaying the contents (e.g., splash screen with logo and zero or more error messages) of the frame buffer 126 to displaying the output (e.g., eDP or similar) of the PCH 112 via SOLC_CLK 214 and SOLC_DAT 216. Thus, the EC 108 may instruct the TCON 122 to switch during the BIOS 120 boot, after the PCH 112 signals that the PCH 112 is ready (e.g., the video driver has been loaded and the like).

The TCON 122 may send a hot plug detect (HPD) signal from eDP_HPD 236 of the eDP_HPD 236 of the TCON 122 to PCH 112. HPD is a signal from the display device to the host telling the host that the extended display identification data (EDID) data is ready to be read by the host. Hot plugging a display device to a computing device means that both the display device and the computing device are power-on while they are being connected. HPD is a feature of display protocols such as high definition media interface (HDMI), DisplayPort, digital video interface (DVI) and the like. The HPD signal may cause re-initialization of the connection carrying the video signal between the PCH 112 and the TCON 122.

The PCH 112 may send a signal from ENBKL 242 of the PCH 112 to DISPOFF 226 of the TCON 122, indicating to enable a backlight of the display panel 128. The PCH 112 may send a signal from PCH_INV_PWM 244 of the PCH 112 to INV_PWM 228 of the TCON 122, to change the brightness of the display panel 128.

Thus, after the BIOS has booted (or during the BIOS boot), when the PCH is ready, the PCH may signal to the EC that the PCH is ready to provide a video signal (e.g., eDP). In response to the signal from the PCH, the EC may cause (e.g., by sending a command to the TCON 122 via SOLC_CLK 214 and SOLC_DAT 216) to the TCON to switch from displaying the contents of the frame buffer to displaying the output of the PCH 112.

Figure 4:
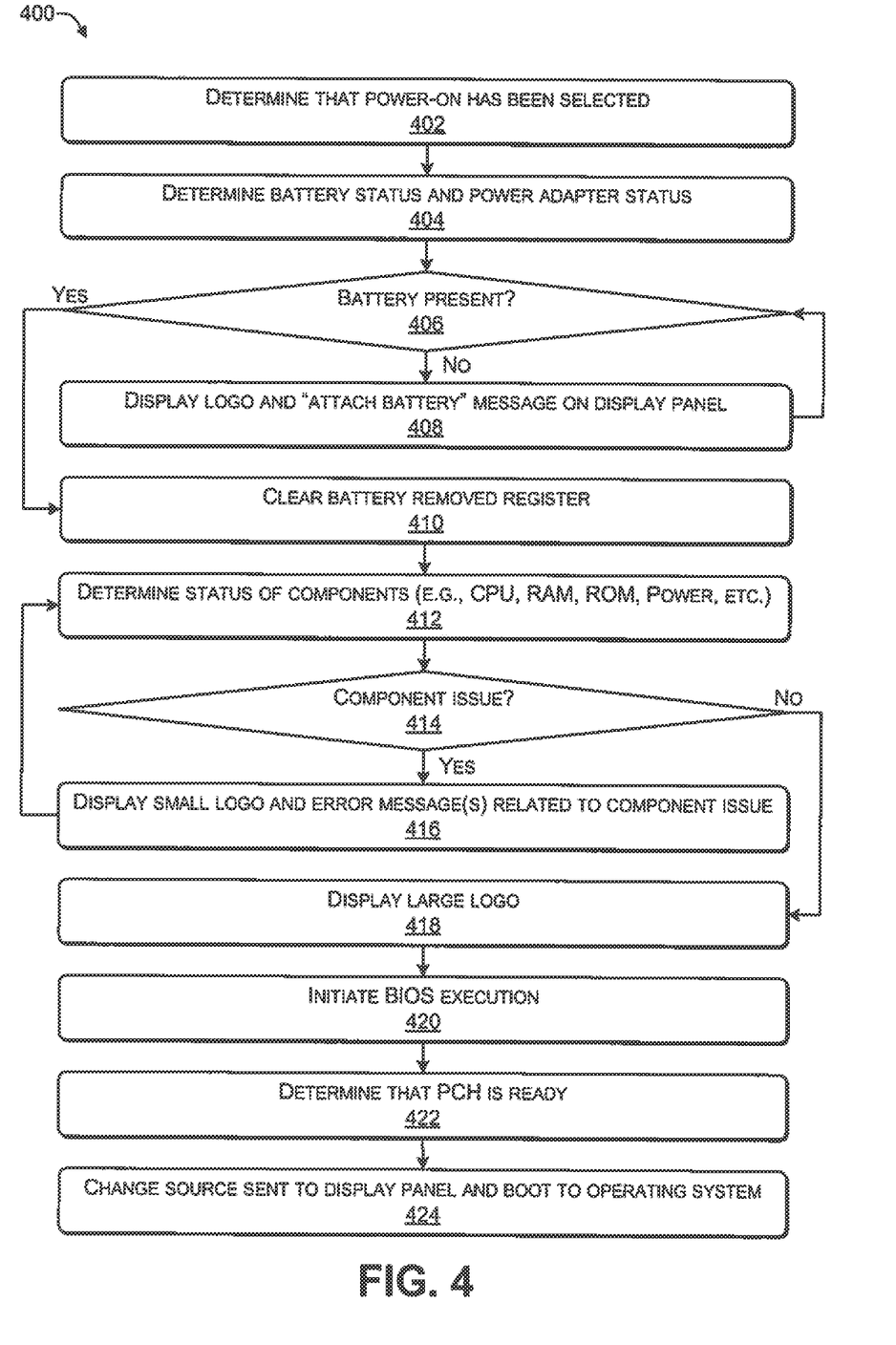
FIG. 4 is a flowchart of a process that includes displaying a small logo and one or more error messages related to a component issue, according to some embodiments.

In the flow diagram of FIG. 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 400 is described with reference to FIGS. 1, 2, and 3 as described above, although other models, frameworks, systems and environments may be used to implement these processes.

FIG. 4 is a flowchart of a process 400 that includes displaying a logo and one or more error messages related to a component issue, according to some embodiments. The process 400 may be performed by the EC 108 and TCON 122 of FIGS. 1, 2, and 3.

At 402, the process may determine that power-on has been selected. At 404, the process may determine a battery status and a power adapter status. For example, in FIG. 1, the EC 108 may determine that the power selector 106 has been selected and determine a status of the battery 116 (e.g., using the BMU 118) and of the power adapter 142 connected to the voltage input 114.

At 406, the process may determine if a battery is present. If a determination is made at 406, that "no" the battery is not present, then the process may display a small logo and an "attach battery" message, at 408, and the process may proceed back to 406. If a determination is made at 406, that "yes" the battery is present, then the process may clear a "battery removed" register, at 410, and the process may proceed to 412. For example, in FIG. 1, the EC 108 may determine if the battery 116 is present. If the battery 116 is not present, the EC 108 may instruct the TCON to assemble and cause to be displayed the image 134 that includes the small logo 136, the message 138(1) that the battery is missing and the message 138(2) asking that the battery 116 be reconnected to the computing device 102. The power to display the small logo and messages may be provided by a coin cell battery used to power a real-time clock (RTC) of the computing device 102. If the BMU 118 indicates that the battery was removed but is now present, the EC 108 may clear a battery register 118 (that is used to indicate when the battery 116 has been removed) of the BMU and continue with the pre-boot. At 412, the process may determine a status of various components (e.g., CPU, RAM, BIOS, power adapter, and the like) of the computing device. At 414, the process may determine whether there is a component issue. If the process determines, at 414, that "yes" there is a component issue, then the process may display a logo and one or more error messages related to (e.g., providing more information about) the component issue, and the process may proceed back to 412, to determine status of the components. The process may repeat 410, 412, and 414 until no component issues are identified. For example, in FIG. 1, the EC 108 may determine a status of various components, such as, for example, the CPU 110, the PCH 112, the power adapter 142, the BIOS 120, RAM, and the like. Determining the status may include determining that each component is powered on and can be accessed without encountering an error, that no error flags or error bits associated with the component have been set, that each component has not recently (e.g., since the previous power-on) generated an error log, and the like.

If the process determines, at 414, that "no" there are no issues, then the process may display a large logo, at 418. At 420, the process may initiate execution of a BIOS. At 422, the process may determine that a PCH is ready (e.g., to provide video from an eDP or other video output). At 424, the process may change a content source sent to a display panel and boot to an operating system. For example, in FIG. 1, if the EC 108 determines that there are no component issues, then the EC 108 may instruct the TCON 122 to create and display, on the display panel 128, the image 134 that includes the logo 134. The EC 108 may initiate execution of the BIOS 120. During the execution of the BIOS 120, the PCH 112 may become ready (e.g., the BIOS 120 may load a video driver) to provide video output from a video source (e.g., eDP). After the PCH 112 becomes ready, the PCH 112 may signal the EC 108 that the PCH 112 is ready. In response to receiving the signal, the EC 108 may signal the TCON 122 to stop displaying the image 134 from the frame buffer 126 and to switch to displaying the eDP output of the PCH 112. The BIOS 120 may continue to boot, including loading an operating system.

Thus, when a power-on selector is selected, an EC may determine a status of various components of the computing device. If the EC finds an issue, then the EC may instruct a TCON to assemble a splash screen with a logo and one or more error messages providing details regarding the issues. If the EC does not find any issues, then the EC may instruct the TCON to display a logo and initiate booting a BIOS. During the booting of the BIOS, when a PCH is ready to provide video, the PCH may signal to the EC that the PCH is ready. In response, the EC may instruct the TCON to switch from displaying the logo to displaying the video output of the PCH. In this way, if issues are found during pre-boot and/or before the CPU is powered ON, the user and service technicians may be provided with detailed error messages identifying the component having the issue and details regarding the issue to enable the issue to be quickly resolved. The user and service technician are not required to decode cryptic blinking lights or beeps to resolve the issue.

Figure 5:
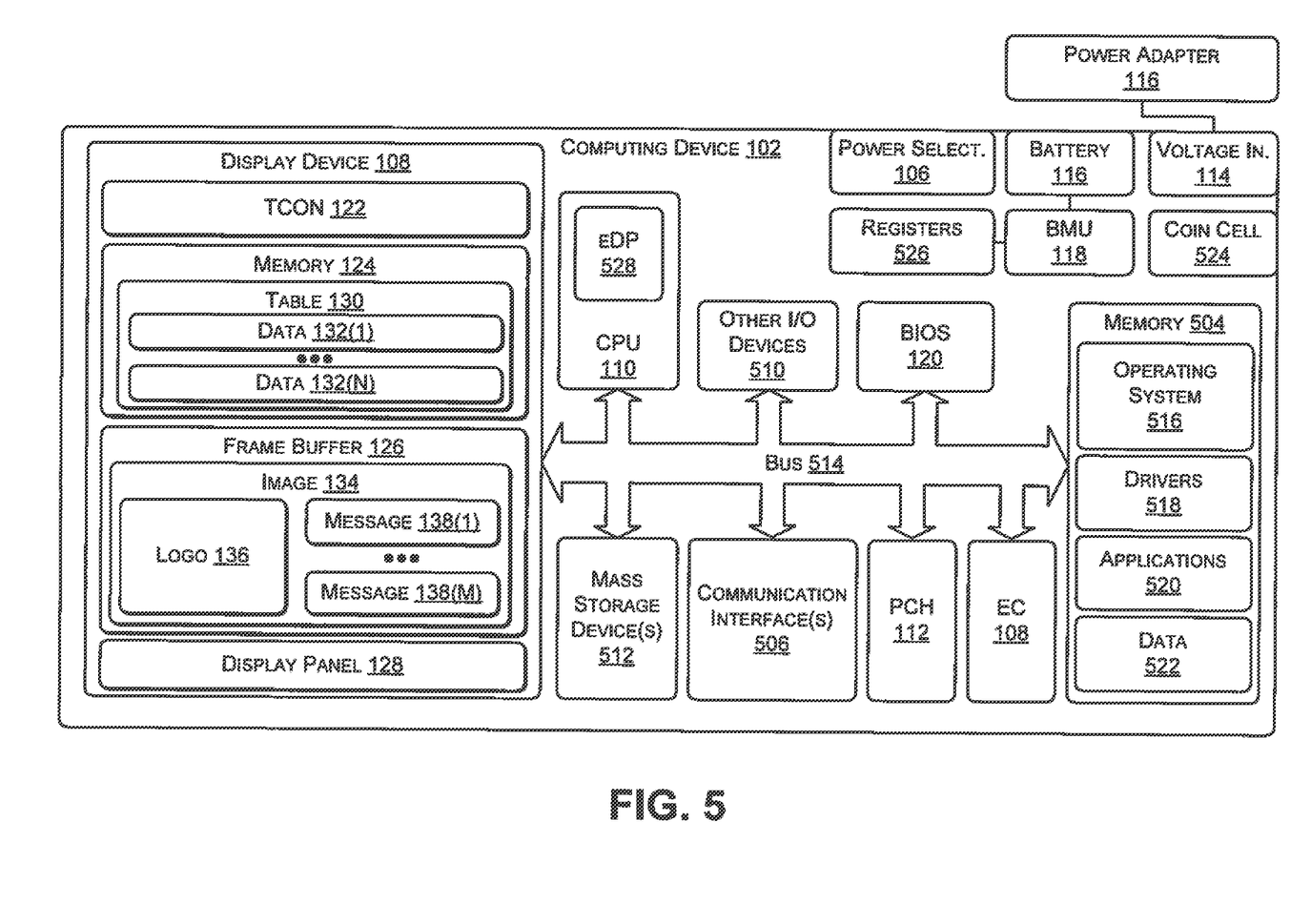
FIG. 5 illustrates an example configuration of a computing device that can be used to implement the systems and techniques described herein.

FIG. 5 illustrates an example configuration of the computing device 102 of FIG. 1. The computing device 102 may include one or more processors (e.g., CPU 110), a random access memory (RAM) 504, communication interfaces 506, the display device 108, other input/output (I/O) devices 510 (e.g., keyboard, trackball, and the like), and one or more mass storage devices 512 (e.g., optical drive (e.g., CD, DVD, or Blu-ray), disk drive, solid state disk drive, non-volatile memory express (NVME) drive, or the like), configured to communicate with each other, such as via one or more system buses 514 or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The CPU 110 is a hardware device that may include a single processing unit or a number of processing units, all of which may include single or multiple computing units or multiple cores. The CPU 110 may include a graphics processing unit (GPU) that is integrated into the CPU 110 or the GPU may be a separate processor device from the CPU 110. The CPU 110 may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU 110 may be configured to fetch and execute computer-readable instructions stored in the memory 504, mass storage devices 512, or other computer-readable media.

Memory 504 and mass storage devices 512 are examples of computer storage media (e.g., memory storage devices) for storing instructions that can be executed by the processors 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory 504 and mass storage devices 512 may be collectively referred to as memory or computer storage media herein and may be any type of non-transitory media capable of storing computer-readable, processor-executable program instructions as computer program code. The computer program code can be executed by the processors 502 as a particular machine configured for carrying out the operations and functions described in the implementations herein.

The computing device 102 may include one or more communication interfaces 506 for exchanging data via a network. The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 506 can also provide communication with external storage, such as a storage array, network attached storage, storage area network, cloud storage, or the like.

The display device 108 may be used for displaying content (e.g., information and images) to users. Other I/O devices 510 may be devices that receive various inputs from a user and provide various outputs to the user, and may include a keyboard, a touchpad, a mouse, a printer, audio input/output devices, and so forth. The computer storage media, such as memory 504 and mass storage devices 512, may be used to store software and data, such as, for example, an operating system 516, one or more drivers 518 (e.g., including a video driver for the PCH 112), one or more applications 520, and data 522.

The EC 108 may determine that the power selector 106 has been selected to initiate a power-on of the computing device 102. In response, the EC 108 may determine a status of the battery 116 by reading registers 526 that are maintained by the BMU 118. The EC 108 may determine information about the power adapter 142 connected to the voltage input 114 to determine whether the power adapter 116 is compatible with the computing device 102, can provide sufficient power for the power usage of the computing device 102, and the like.

The EC 108 may determine if the battery 116 is present. If the battery is not present, then the EC 108 may instruct the TCON 122 to display a small logo 136 and an "attach battery" message 138(1). The power to display the small logo and messages may be provided by a coin cell battery 524 used to power a real-time clock (RTC) of the computing device 102. If the BMU 118 indicates that the battery was removed but is now present, the EC 108 may clear a battery register (that is used to indicate when the battery 116 has been removed) of the registers 526 and continue with the pre-boot. If the power adapter 116 is incompatible, the EC 108 may instruct the TCON 122 to display a small logo 136 and an "incompatible adapter" message 138(1). If the power adapter 116 is inadequate, the EC 108 may instruct the TCON 122 to display a small logo 136 and an "inadequate power provided by power adapter" message 138(1), and "damage to the computing device may occur" message 138(2).

The EC 108 may determine a status of various components, such as, for example, the CPU 110, the PCH 112, the power adapter 142, the BIOS 120, the RAM 504, and the like. Determining the status may include determining that each component is receiving power and can be accessed without encountering an error, that no error flags or error bits associated with the component have been set, that each component has not recently (e.g., since the previous power-on) generated an error log, and the like.

If the EC 108 determines that there are no component issues, then the EC 108 may instruct the TCON 122 to create and display, on the display panel 128, the image 134 that includes the logo 134. The EC 108 may initiate execution of the BIOS 120. During the execution of the BIOS 120, the PCH 112 may become ready (e.g., the BIOS 120 may load a video driver) to provide video output from a video source, such as eDP 528. After the PCH 112 becomes ready, the PCH 112 may signal the EC 108 that the PCH 112 is ready. In response to receiving the signal, the EC 108 may signal the TCON 122 to stop displaying the image 134 from the frame buffer 126 and to switch to displaying the output of eDP 528 of the PCH 112. The BIOS 120 may continue to boot, including loading an operating system.

Thus, when the power-on selector 106 is selected, the EC 108 may determine a status of various components of the computing device 102. If the EC 108 finds an issue that would prevent booting, then the EC 108 may instruct a TCON 122 to assemble a splash screen with a logo 136 and one or more error messages 138 providing details regarding the issues. If the EC 108 does not find any issues preventing booting the BIOS 120, then the EC 108 may instruct the TCON 122 to display the logo 136 and initiate booting the BIOS 120. During the booting of the BIOS 120, when the eDP 528 of the PCH 112 is ready, the PCH 112 may signal the EC 108. In response, the EC 108 may instruct the TCON 122 to switch from displaying the contents of the frame buffer 126 to displaying the video output of the eDP 528. In this way, if issues are found during pre-boot (e.g., issues preventing booting the BIOS 120), the user and/or service technicians may be provided with detailed error messages 138 identifying the component having the issue and details regarding the issue to enable the issue to be quickly resolved. The user and service technician are not required to decode cryptic blinking lights or beeps to resolve the issue.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
  determining, by an embedded controller of a computing device, that a power-on has been initiated;
  determining, by the embedded controller, that a particular component of a plurality of components of the computing device has an issue that prevents a normal boot of a basic input output system (BIOS) of the computing device; and
  only upon determining that the particular component has the issue, then:
    sending a message from the embedded controller to a timing controller of a display panel, the message instructing the timing controller to access a data structure on a non-volatile storage and select one or more error or warning message data items_associated with the particular component or a system state from multiple different data items stored in the data structure,
    in the timing controller, responding to the message from the embedded controller by:
      accessing the non-volatile storage from the timing controller to select and retrieve the one or more error or warning message data items from the data structure,
      assembling multiple separate data items into a composite bitmapped image, wherein the multiple separate data items include a logo and the one or more error or warning message data items retrieved from the data structure, and
      displaying, on a display area of the display panel, the composite bitmapped image; and
  only upon determining that the particular component does not have the issue, then in the timing controller:
    accessing the non-volatile storage to select and retrieve one or more other data items from the data structure, and
    displaying, on the display area of the display panel, a different image from the composite bitmapped image, the different image comprising the one or more other data items retrieved from the data structure and not comprising the one or more error or warning message data items;
  wherein a display device connected to the computing device comprises the display panel and the timing controller.

2. The method of claim 1, further comprising:
  determining a status of individual components of the plurality of components, wherein the plurality of components comprise a central processing unit (CPU), a random access memory (RAM), a battery connected to the computing device, a power adapter connected to the computing device, the BIOS, and a storage device connected to the computing device.

3. The method of claim 1, wherein the composite bitmapped image comprises a small logo that occupies only a portion of the display area and that is assembled together with the one or more error or warning message data items positioned in a remaining portion of the display area that is not occupied by the small logo; and where the different image comprises a large logo without the one or more error or warning message data items, the large logo sized to occupy at least a portion of the display area that is not occupied by the small logo.

4. The method of claim 1, wherein the timing controller further responding to the message from the embedded controller by:
  copying the one or more error or warning message data items from a flash memory that is accessible to the timing controller to create the composite bitmapped image; and
  transferring the composite bitmapped image via direct memory access to a frame buffer associated with the display panel.

5. The method of claim 3, further comprising:
  determining whether or not the issue that prevented booting the BIOS of the computing device is present; and
  only upon determining that the issue that prevented booting the BIOS of the computing device is not present, then performing the following:
    initiating the booting of the BIOS, and
    sending a second message from the embedded controller to the timing controller, the second message causing the timing controller to display, on the display panel, the different image comprising the large logo without the one or more error or warning message data items.

6. The method of claim 5, further comprising:
  receiving an instruction from a video source of the computing device that the video source is available; and
  sending a third message from the embedded controller to the timing controller, the third message instructing the timing controller to display, on the display panel, an output of the video source.

7. The method of claim 6, wherein the video source comprises an embedded display port (eDP) or a mobile industry processor interface (MIPI) display serial interface (DSI).

8. A computing device comprising:
  a plurality of components comprising one or more processors;
  an embedded controller;
  a read-only memory (ROM) to store a basic input output system (BIOS);
  wherein the embedded controller is configured with instructions to, before the one or more processors begin to execute:
    determine that a power-on has been initiated;
    determine that a particular component of the plurality of components of the computing device has an issue that prevents booting the BIOS; and
    only upon determining that the particular component has the issue, then:
      send a first message from the embedded controller to a timing controller of a display panel, the first message instructing the timing controller to access a data structure on a non-volatile storage and select multiple separate data item images including the one or more error or warning message data items_associated with the particular component or a system state from multiple different data items stored in the data structure;

assemble a composite bitmapped image that includes a logo and the one or more error or warning message data items selected from the data structure, and display, on a display area of the display panel, the custom composite bitmapped image; and only upon determining that the particular component does not have the issue, then send a second message from the embedded controller to the timing controller of the display panel to cause the timing controller to:

access the non-volatile storage to select and retrieve one or more other data items from the data structure, and display, on the display area of the display panel, a different image from the composite bitmapped image, the different image comprising the one or more of the other data items retrieved from the data structure and not comprising the one or more error or warning message data items;

wherein a display device connected to the computing device comprises the display panel and the timing controller.

9. The computing device of claim 8, wherein the plurality of components comprise a central processing unit (CPU), a random access memory (RAM), a battery connected to the computing device, a power adapter connected to the computing device, and a storage device connected to the computing device.

10. The computing device of claim 8, wherein:

the first message further instructs the timing controller to display a logo, an icon, a quick response (QR) code, or another graphics image on the display panel; and the first message is compliant with an I2C protocol.

11. The computing device of claim 8, wherein the one or more error messages comprise text indicating at least one of:

a power adapter is not connected to the computing device;

the power adapter is incompatible with the computing device;

the power adapter is inadequate for a power usage of the computing device;

the battery is not present;

a request to connect the battery;

a charge level of the battery is below a predetermined level;

the battery is being charged;

a boot process will initiate after the charge level is equal to or above the predetermined level;

a boot process will take longer than normal;

a bootable image was not found on one or more storage devices connected to the computing device;

a processor error associated with a central processing unit (CPU) occurred;

a memory error associated with a random-access memory (RAM) of the computing device occurred;

a ROM error associated with the ROM occurred; or an error code associated with a particular component of the plurality of components.

12. The computing device of claim 8, where the composite bitmapped image further comprises a small logo that occupies only a portion of the display area and that is assembled together with the one or more error or warning message data items positioned in a remaining portion of the display area that is not occupied by the small logo; and wherein the different image comprises a large logo without the one or more error or warning message data items, the large logo sized to occupy at least a portion of the display area that is not occupied by the small logo; and wherein the embedded controller is further configured to:

determine whether or not there are zero issues preventing booting the BIOS; and perform the following only upon determining that that there are zero issues preventing booting the BIOS:

initiate the booting of the BIOS, and send the second message from the embedded controller to the timing controller, the second message causing the timing controller to display, on the display panel, the different image comprising the large logo without the one or more error or warning message data items.

13. The computing device of claim 12, wherein the embedded controller is further configured to:

receive an instruction from a peripheral control hub (PCH) of the computing device that a video signal is available; and send a third message from the embedded controller to the timing controller, the third message instructing the timing controller to display, on the display panel, the video signal.

14. The computing device of claim 8, wherein the embedded controller is further configured to:

determine a status of a battery of the computing device using data provided by a battery management unit of the computing device.

15. One or more non-transitory computer readable media storing instructions executable by an embedded controller to:

determine that a power-on has been initiated;

determine that a particular component of the plurality of components of the computing device has an issue that prevents booting the BIOS; and only upon determining that the particular component has the issue, then:

send a first message from the embedded controller to a timing controller of a display panel, the first message instructing the timing controller to access a data structure on a non-volatile storage and select multiple separate data item images including one or more error or warning message data items_associated with the particular component or a system state from multiple different data items stored in the data structure;

assemble a composite bitmapped image that includes a logo and the selected one or more error or warning message data items from the data structure, and display, on a display area of the display panel, the composite bitmapped image; and only upon determining that the particular component does not have the issue, then send a second message from the embedded controller to the timing controller of the display panel to cause the timing controller to:

access the non-volatile storage to select and retrieve one or more other data items from the data structure, and display, on the display area of the display panel, a different image from the composite bitmapped image, the different image comprising the one or more other data items retrieved from the data structure and not comprising the one or more error or warning message data items;

wherein a display device connected to the computing device comprises the display panel and the timing controller.

16. The one or more non-transitory computer readable media of claim 15, wherein the instructions are further executable by the embedded controller to:

determine a status of individual components of the plurality of components, wherein the plurality of components comprise a central processing unit (CPU), a random access memory (RAM), a battery connected to the computing device, a power adapter connected to the computing device, the BIOS, and a storage device connected to the computing device.

17. The one or more non-transitory computer readable media of claim 15, wherein the composite bitmapped image further comprises a small logo that occupies only a portion of the display area and that is assembled together with the one or more error or warning message data items positioned in a remaining portion of the display area that is not occupied by the small logo; and wherein the different image comprises a large logo without the one or more error or warning message data items, the large logo sized to occupy at least a portion of the display area that is not occupied by the small logo.

18. The one or more non-transitory computer readable media of claim 15, wherein:

the one or more error message data items are copied by a timing controller of a display panel from a flash memory of the timing controller to create the composite bitmapped image; and the composite bitmapped image is transferred, by the timing controller using direct memory access, to a frame buffer associated with the display panel.

19. The one or more non-transitory computer readable media of claim 17, wherein the instructions are further executable by the embedded controller to:

determine whether or not the issue that prevented booting the BIOS of the computing device is resolved;

determine whether or not any issues prevent booting of the BIOS; and only upon determining that the issue that prevented booting the BIOS of the computing device is resolved and that no issues prevent booting of the BIOS, then:

initiate the booting of the BIOS, and send the second message from the embedded controller to the timing controller, the second message causing the timing controller to display, on the display panel, the different image comprising the large logo without the one or more error or warning message data items.

20. The one or more non-transitory computer readable media of claim 15, wherein the instructions are further executable by the embedded controller to:

receive an instruction from the computing device that a video signal is available; and send a third message from the embedded controller to the timing controller, the third message instructing the timing controller to display, on the display panel, the video signal.

* * * * *